Feb. 16, 1926.                                                         1,573,391
J. M. HIBNER
METHOD OF MANUFACTURING CUSHION TIRES
Filed July 17, 1923

Inventor
JOHN M. HIBNER
By his Attorney
Ernest Hopkinson

Patented Feb. 16, 1926.

1,573,391

UNITED STATES PATENT OFFICE.

JOHN M. HIBNER, OF DETROIT, MICHIGAN, ASSIGNOR TO MORGAN & WRIGHT, OF DETROIT, MICHIGAN, A CORPORATION OF MICHIGAN.

METHOD OF MANUFACTURING CUSHION TIRES.

Application filed July 17, 1923. Serial No. 652,005.

*To all whom it may concern:*

Be it known that I, JOHN M. HIBNER, a citizen of the United States, residing at Detroit, county of Wayne, and State of Michigan, have invented a certain new and useful Method of Manufacturing Cushion Tires, of which the following is a full, clear, and exact description.

This invention relates to the manufacture of solid tires of a cushioning type provided with a cavity formation augmenting the yielding or cushioning properties of the vulcanized rubber composition.

The invention aims to facilitate and cheapen the cost of manufacturing such type of solid tires and to produce an improved article. It also provides a method for curing the rubber composition to a one-piece metallic rim which has never heretofore been commercially feasible. It also aims to provide a method for manufacturing a cushioning type of solid tire with any desired cavity formation, such as a regular or irregular annular channel, a series of pockets disposed about the circumference of the rim, a plurality of parallel annular cavities,—in short, any internal cavity formation that may be deemed best.

With the illustrated embodiment in mind and without limiting intention, the invention briefly consists in vulcanizing the hard and soft rubber compositions of the body of a solid tire to a one-piece metallic rim with a core of comminuted material, defining a desired cavity formation, the assembled composition rim and core being externally confined, as in a sectional mold, while vulcanized. The core of comminuted material is subsequently removed by drilling a hole in the rim, out of which the comminuted material is shaken, poked, or blown, after vulcanization.

A preferred embodiment of the invention is disclosed in the accompanying drawings in which.

Figure 4:
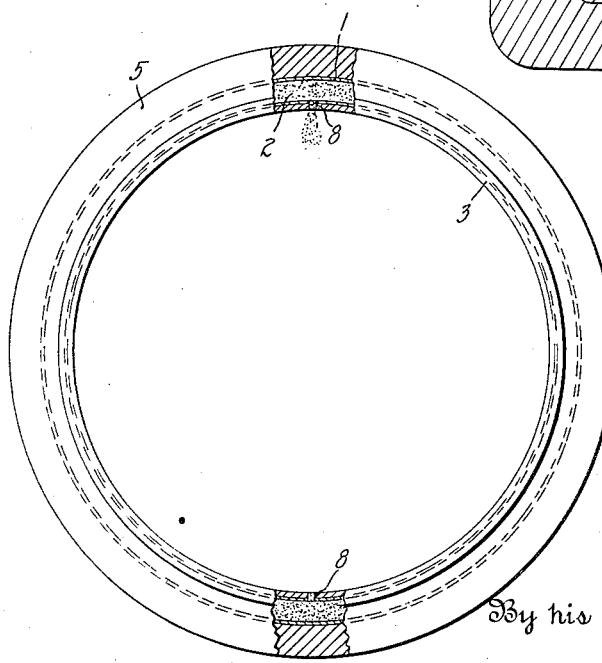

And Figure 4 shows the completed tire after its rim has been drilled for removal of the comminuted material.

Figure 1:
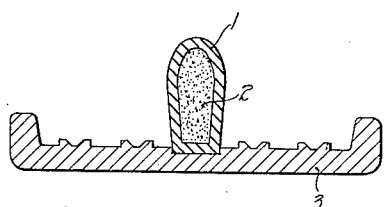
Figure 1 illustrates a bag holding comminuted material mounted on a one-piece metallic rim.

The invention may be variously practiced or carried on but at the present time it appears most desirable to first make an annular bag 1 of rubber composition and to partially vulcanize it for convenience in the handling. Then, the bag is filled with comminuted material 2, either before or after the bag is mounted on a metallic rim 3, in the position shown in Figure 1. The comminuted material may be readily introduced by inserting a funnel through a hole punched in the top of the bag and tapping the bag as the comminuted material enters so as to pack it closely. The hole (or holes) punched in the bag for this purpose may be closed with a patch or plug of rubber. Hard rubber composition 4 is preferably applied to the metallic rim 3 before the bag 1 is mounted in position thereon, but it may be applied after the bag is mounted, there being but little more difficulty in pressing the relatively hard rubber composition 4 tightly to the metallic rim 3 in the one case than in the other.

Soft rubber composition 5, constituting the main body of the tire, may be made in any suitable shape and size for the particular tire being manufactured. It may be tubed with an annular groove to fit about the bag 1, or pressed, or both, or plied up by winding strips of vulcanizable rubber composition about the sides and over the bag, these different procedures being well-known in the art. Preferably, however, the stock is tubed roughly to shape and then cold-pressed in a mold about a steel core, one or two times, to adapt it to fit the bag snugly.

Figure 2:
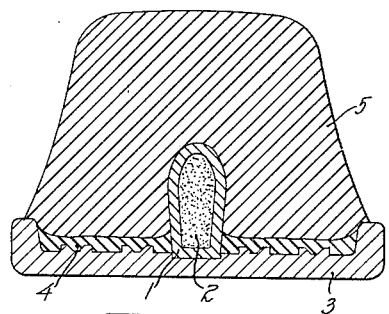
Figure 2 is a cross-section of the assembled rubber composition rim and core.
Figure 3:
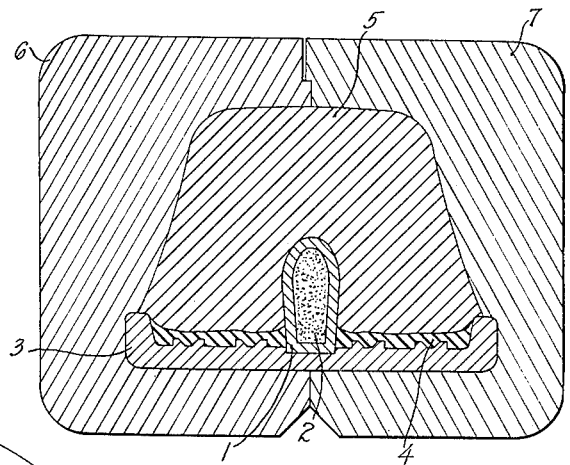
Figure 3 is a cross-section through a mold surrounding the assemblage during vulcanization.

The rim, rubber and comminuted core are then assembled as shown in Figure 2, in any convenient manner. The next step is to vulcanize the green rubber to the rim. While any of the prior art practices may be availed of, it is most desirable to cure the tire while externally confined in the sections 6 and 7 of a mold. A plurality of molds are then usually stacked in a press and simultaneously cured.

After the tire is vulcanized, the mold sections are taken off and the comminuted material removed. This may be done by drilling one or more holes 8 through the metallic rim into the comminuted material 2, which can be removed by tapping or poking and preferably finally with compressed air.

In the foregoing, the invention has been set forth in connection with the manufacture of a cushion type of solid tire whose cavity is a regular annulus, that is, everywhere throughout its extent a cross-section would be the same. It will be obvious that the annular cavity may be irregular or interrupted if desired. Instead of one annular bag, a plurality of short bags may be employed, either arranged end to end or inclined to the circumference of the rim. A plurality of annular bags 1 may be disposed in parallelism, or in any desired arrangement, to enable the tire to be manufactured with any desired number, size and shape of cavities.

The bag 1 is merely a container or holder for the comminuted material 2. It is not believed to be essential to make this bag out of rubber composition and any suitable materials may be employed to hold the rubber composition is assembled on the metallic rim 3 about the core. In fact, no separately formed bag 1 need be employed within the broadest aspects of the invention as the channel or groove that is tubed, pressed, or otherwise formed, in the rubber composition body 5, may be filled with comminuted material, held at the ends of the groove by patches of thin rubber or by baked sand cores, or otherwise as convenient. That is to say, the soft rubber body with the groove formed in a more or less straight length thereof, and the ends walled up, may be utilized as a trough for the comminuted material and assembled by coiling about a rim mounted tangentially above a horizontal table or conveyor.

Another alternative, dispensing with the need of a container or envelope for the comminuted material is to make the comminuted material in sections of baked sand, for instance, and mount them on the rim. Then subsequently, assemble the vulcanizable rubber composition thereabout as previously indicated.

The comminuted material 2 may be any substance which is substantially resistant to displacement or flow (either naturally or rendered so by treatment) during vulcanization when there is a tendency of the rubber, because of the pressures developed, to close in on the core more at some places than at others. And it is advisable to employ a material that will stay where put without shifting to an objectionable extent. Sand, steel grit, steel shot, or metallic powders, such as aluminum, may be employed, for instance, the optimum substance for the core being not only a comminuted material that can be removed after vulcanization but also having good conducting properties. If unenveloped sand is employed as the comminuted material, it is preferred to make the hard rubber 4 of a composition less fluid at a vulcanizing heat. If a bag filled with shot is used, a liquid metal like mercury or alloys fluid at low temperatures may be utilized to fill the voids. The composition of both the hard and soft rubber portions, of course, may be varied to meet the requirements of manufacture, and service. Any suitable designs may be formed in the tread or on the sides of the tire as heretofore.

The invention is believed to be broad and basic in character, being the first practical method for making a hollow type cushion tire on a one-piece complete and unweakened metallic rim. Many changes and alterations may be made in the procedure without departure from the principles underlying the invention and reference should therefore be made to the accompanying claims for an understanding of its scope.

Having thus described my invention, what I claim and desire to protect by Letters Patent is:—

1. That method of manufacturing solid tires of the cushion type which consists in, vulcanizing rubber composition to a one-piece metallic rim with enclosed comminuted material defining an internal cavity formation, and finally removing the material in comminuted form from the vulcanized tire on the rim.

2. That method of manufacturing a cushion type of solid tire consisting of vulcanizable rubber composition and having an internal cavity formation which consists in, mounting on a metallic rim a core of comminuted material substantially resistant to flow or displacement, assembling vulcanizable rubber composition thereabout, vulcanizing the assemblage while externally confined, and finally removing the material in comminuted form from the vulcanized assemblage of tire and rim.

3. That method of manufacturing a cushion type of solid tire consisting of vulcanizable rubber composition and having an internal cavity formation which consists in, mounting a bag containing comminuted material substantially resistant to flow or displacement on a metallic rim, applying vulcanizable rubber composition to the rim and about the bag, vulcanizing the assemblage while externally confined in a mold, and finally removing the material in comminuted form from the bag.

4. That method of manufacturing a cushion type of solid tire consisting of vulcanizable rubber composition and having an internal cavity formation which consists in, assembling vulcanizable rubber composition on a one-piece metallic rim with comminuted material defining a desired internal cavity formation for enhancing the cushioning properties of the completed article, vulcanizing the assemblage while externally confined, and finally removing the material in comminuted form substantially completely from the vulcanized assemblage of tire and rim.

5. That method of manufacturing a cushion type of solid tire consisting of vulcanizable rubber composition and having an internal cavity formation which consists in, making a hollow annular bag of rubber composition and partially curing it, packing the bag with comminuted material substantially resistant to displacement or flow, mounting the same on a metallic rim, assembling vulcanizable rubber composition on the rim and around the filled bag, enclosing the assemblage in a mold, vulcanizing the tire while confined in the mold, and removing the material in comminuted form through the rim after the vulcanization has fixed the cavity formation in the tire.

6. That method of manufacturing cushion tires which consists in, amassing vulcanizable rubber composition on a metallic rim and about a core of comminuted material confined to approximate the cushioning cavity formation desired in the product, vulcanizing the composition to the rim while externally confined, and subsequently extracting the material in comminuted form through the rim to which the rubber composition has been vulcanized.

7. That method of manufacturing solid tires of the cushion type which consists in, vulcanizing rubber composition to a one-piece metallic rim with enclosed comminuted metal defining an internal cavity formation, and finally removing the metal in comminuted form from the vulcanized tire through the rim.

8. That method of manufacturing a cushion type of solid tire consisting of vulcanizable rubber composition and having an internal cavity formation which consists in, mounting on a metallic rim a core of comminuted metal substantially resistant to flow or displacement, assembling vulcanizable rubber composition thereabout, vulcanizing the assemblage while externally confined, and finally removing the metal in comminuted form from the tire vulcanized to the rim.

Signed at Detroit, county of Wayne, and State of Michigan, this 12th day of July, 1923.

JOHN M. HIBNER.